Patented Jan. 19, 1926.

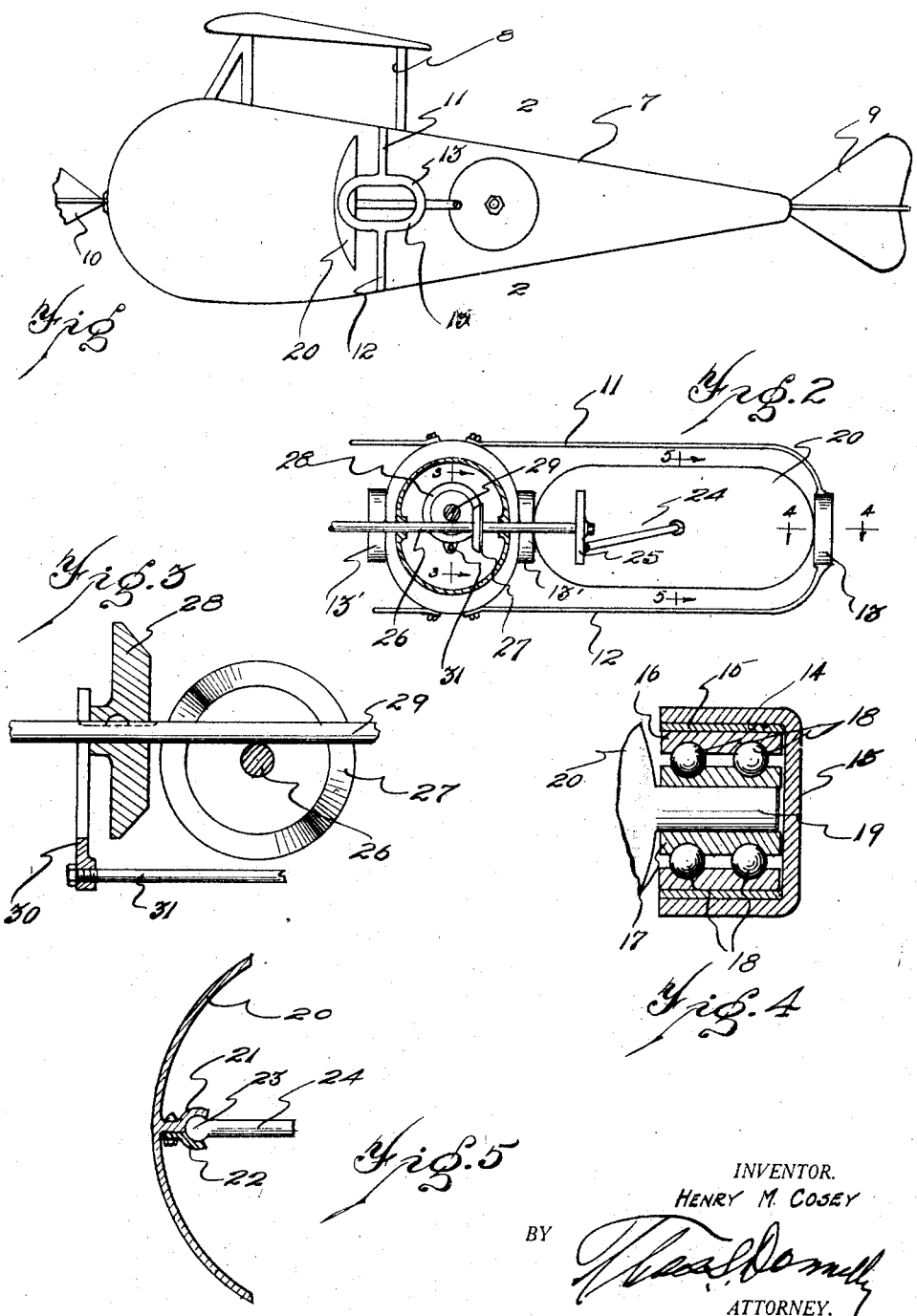

1,570,044

UNITED STATES PATENT OFFICE.

HENRY M. COSEY, OF FLINT, MICHIGAN.

AEROPLANE PROPELLING MECHANISM.

Original application filed April 13, 1925, Serial No. 22,649. Divided and this application filed July 27, 1925. Serial No. 46,244.

*To all whom it may concern:*

Be it known that I, HENRY M. COSEY, a citizen of the United States, residing at Flint, in the county of Genesee and State of Michigan, have invented certain new and useful Improvements in an Aeroplane Propelling Mechanism, of which the following is a specification.

My invention relates to a new and useful improvement in a propelling mechanism for aeroplanes, and has for its object the provision of a propelling mechanism which will serve to propel an aeroplane forwardly in a noiseless manner, thus providing a propelling mechanism for aeroplanes particularly useful in time of war, inasmuch as the advent of an aeroplane over the enemy's lines is not proclaimed by any noise resulting from the propelling mechanism.

This application is a divisional application of my application for a patent filed April 30th, 1925, Serial No. 22649.

Another object of the invention is the provision of a propelling mechanism of this class which will be simple in construction, economical of manufacture and highly efficient in use.

Other objects reside in the specific structure and arrangement of parts which are described and claimed herein.

The invention will be best understood by a reference to the accompanying drawings, which form a part of this specification, and in which, Fig. 1 is a side elevational view of an aeroplane embodying the invention, Fig. 2 is a sectional view taken on substantially line 2—2 of Fig. 1, Fig. 3 is a fragmentary sectional view taken on substantially line 3—3 of Fig. 2, Fig. 4 is a fragmentary sectional view taken on substantially line 4—4 of Fig. 2, Fig. 5 is a sectional view taken on substantially line 5—5 of Fig. 2.

The invention as shown in the drawings is applied to an aeroplane having a body 7, superstructure 8, and rudders 9 and 10. A substantially U-shaped track hanger is provided, having legs 11 and 12 secured to the body 7. A substantially oval-shaped track 13 is carried by the legs 11 and 12, this track being formed channel-shaped to provide the channel as shown in Fig. 4. A suitable lining 15 is mounted in the channel against which engages the periphery of a roller 16, separated from the roller 17, which is fixedly mounted upon the trunnion 19, projecting from the end of the spoon-shaped propeller blade 20 by means of ball bearings 18. These propellers are mounted at opposite sides of the body and any desired number may be used. For the purpose of illustration, description of only one of the propellers and its operating and supporting mechanism is given, inasmuch as the different sets of propellers are duplicates of each other.

Mounted on the body 7 is a track 13' constructed in the same manner as the track 13 and adapted for the reception of a similar trunnion projecting from the blade 20. As shown in Fig. 5, the blade 20 is formed spoon-shaped or concave and provided adjacent its longitudinal axis with an outwardly projecting arm 21 which is clamped by means of a clip 22 to a ball 23 formed on the end of the shaft 24, the connection being a ball and socket connection. The opposite end of the shaft 24 is angularly turned and secured to the face of the disc 25, which is fixedly mounted upon the shaft 26. Keyed to the shaft 26 so as to rotate therewith is a bevel gear 27 adapted for meshing with the bevel gear 28, which is slidably mounted on the shaft 29 and adapted for rotating therewith. Connected to the bevel gear 28 is an arm 30, having an operating rod 31 extended to a position accessible to the driver of the aeroplane so that the driver may gear 28 into mesh with the gear 27 at will. The shaft 29 is connected in a well-known manner to the engine of the aeroplane so that when the gear 28 is brought into mesh with the gear 27, a rotation of the shaft 29 will effect a rotation of the shaft 26. As the shaft 26 rotates, the disc by means of its connection with the blade 20 will cause the blade 20 to travel in the tracks 13 and 13', thus effecting a forward movement of the aeroplane.

The arrangement is a simple and effective one for the purposes, possessing rigidity of structure. The number of parts is also reduced to a minimum, thus effecting a resultant economy in the cost of construction.

While I have illustrated and described the preferred form of construction, I do not wish to limit myself to the precise details of structure shown in the drawings, but desire to avail myself of such variations and modifications as come within the scope of the appended claims.

Having thus described my invention, what I claim as new and desire to secure by Letters Patent is:

1. An aeroplane propeller of the class described, adapted for use with aeroplanes having a body, comprising U-shaped track-bearing members having the ends of the legs secured to said body; a channel-bearing substantially oval-shaped track carried by said legs at their outer ends in spaced relation to said body; channel-bearing and substantially oval-shaped track members mounted on said body; a spoon-shaped propeller having a trunnion projecting outwardly from each end; a roller mounted on each of said trunnions, one of said rollers adapted to engage in said spaced track and the other adapted to engage in the track mounted on said body.

2. An aeroplane propelling mechanism adapted for use with an aeroplane having a body, comprising a substantially U-shaped track-bearing member having the ends of its legs secured to said body; a channel-bearing substantially oval-shaped track carried by said legs at their outer ends in spaced relation to said body; channel-bearing oval-shaped tracks mounted on said body; concave propellers; a trunnion projecting outwardly from opposite ends of said propellers; a roller mounted on said trunnions, the roller at one end of said propeller engaging in the track mounted on said body and the roller on the other end of said propeller engaging in the track spaced from said body; an operating arm secured at one end to said propellers adjacent the center thereof; a rotatable disc connected to the opposite end of said operating arm; and means for rotating said disc for effecting a travel of said propellers around said tracks.

3. An aeroplane propelling mechanism adapted for use with an aeroplane having a body, comprising a substantially U-shaped track-bearing member having the free ends of its legs secured to said body, said legs projecting at right angles to the longitudinal vertical plane of said body; a substantially oval-shaped channel-bearing track carried by said legs, at their outer ends, said track being spaced from said body; a substantially oval-shaped channel-bearing track mounted on said body in horizontal alignment with said first-mentioned track; a concave propeller; a trunnion projecting outwardly from each end of said propeller; a ball-bearing roller mounted on each of said trunnions; a wear plate mounted in the channel of said tracks, the roller on one side of said propeller being adapted for engaging in one of said tracks and the roller on the opposite side being adapted for engaging in the other of said tracks; an operating arm swingably connected to said propeller adjacent the center thereof; a rotatable disc connected to said operating arm and adapted upon rotation for effecting a travel of said propeller in said tracks for effecting a forward movement of said body; and means operable at will for effecting a rotation of said disc.

In testimony whereof, I have signed the foregoing specification.

HENRY M. COSEY.